United States Patent
Kulakofsky et al.

(10) Patent No.: US 7,373,981 B2
(45) Date of Patent: May 20, 2008

(54) METHODS OF CEMENTING WITH LIGHTWEIGHT CEMENT COMPOSITIONS

(75) Inventors: David S. Kulakofsky, Katy, TX (US); Pedro Pulido, Villahermosa (MX); Raul Bonifacio, Reynosa (MX); Octavio Araujo Morales, Villahermosa (MX)

(73) Assignee: Halliburton Energy Services, Inc., Duncan, OK (US)

( * ) Notice: Subject to any disclaimer, the term of this patent is extended or adjusted under 35 U.S.C. 154(b) by 250 days.

(21) Appl. No.: 11/057,677

(22) Filed: Feb. 14, 2005

(65) Prior Publication Data

US 2006/0180311 A1   Aug. 17, 2006

(51) Int. Cl.
E21B 33/13   (2006.01)
(52) U.S. Cl. .................... 166/292; 166/285
(58) Field of Classification Search ............... None
See application file for complete search history.

(56) References Cited

U.S. PATENT DOCUMENTS

| | | |
|---|---|---|
| 2,288,557 A | 6/1942 | Vollmer |
| 3,036,633 A | 5/1962 | Mayhew |
| 3,220,863 A | 11/1965 | Mayhew |
| 3,563,475 A | 2/1971 | Emery et al. |
| 3,669,701 A | 6/1972 | Biederman, Jr. |
| 3,804,058 A | 4/1974 | Messenger |
| 3,902,911 A | 9/1975 | Messenger |
| 4,234,344 A | 11/1980 | Tinsley et al. ............... 106/88 |
| 4,235,836 A | 11/1980 | Wassell et al. |
| 4,304,298 A | 12/1981 | Sutton |
| 4,340,427 A | 7/1982 | Sutton |
| 4,367,093 A | 1/1983 | Burkhalter et al. |
| 4,370,166 A | 1/1983 | Powers et al. |
| 4,416,547 A | 11/1983 | Mikolajczyk |
| 4,450,010 A | 5/1984 | Burkhalter et al. |
| 4,565,578 A | 1/1986 | Sutton et al. |
| 4,618,376 A | 10/1986 | Saternus et al. |
| 4,761,183 A | 8/1988 | Clarke |

(Continued)

FOREIGN PATENT DOCUMENTS

EP   0 748 782 A1   12/1996

(Continued)

OTHER PUBLICATIONS

Patent application entitled "Processes for Incorporation Inert Gas In A Cement Compositions containing Spherical Beads" by B. Raghava Reddy, filed Nov. 12, 2003 as U.S. Appl. No. 10/706,431.

(Continued)

*Primary Examiner*—Jennifer H Gay
*Assistant Examiner*—Kerry W. Leonard
(74) *Attorney, Agent, or Firm*—Craig W. Roddy; Conley Rose, P.C.

(57) ABSTRACT

Foamed cement compositions comprising density reducing additives and methods of making and using the same are disclosed. In one embodiment, a method of cementing is disclosed. The method of cementing comprises preparing a base cement composition comprising a cement, a water, and a density reducing additive, wherein the base cement composition comprises a base density. The method further comprises introducing a gas to the base cement composition to provide a cement composition having a density less than the base density and allowing the cement composition to set.

20 Claims, 3 Drawing Sheets

Final Density & Hydrostatic Profile
Annular Fluid Density vs. Measured Depth

U.S. PATENT DOCUMENTS

| | | | |
|---|---|---|---|
| 4,818,288 A | 4/1989 | Aignesberger et al. | |
| 4,886,367 A | 12/1989 | Bragg et al. | |
| 5,046,855 A | 9/1991 | Allen et al. | |
| 5,086,850 A | 2/1992 | Harris et al. | |
| 5,103,908 A | 4/1992 | Allen | |
| 5,114,239 A | 5/1992 | Allen | |
| 5,121,795 A | 6/1992 | Ewert et al. | |
| 5,123,487 A | 6/1992 | Harris et al. | |
| 5,125,455 A | 6/1992 | Harris et al. | |
| 5,127,473 A | 7/1992 | Harris et al. | |
| 5,156,808 A | 10/1992 | Henry et al. | |
| 5,184,680 A | 2/1993 | Totten et al. | |
| 5,289,877 A | 3/1994 | Naegele et al. | |
| 5,314,022 A | 5/1994 | Cowan et al. | |
| 5,346,012 A | 9/1994 | Heathman et al. | |
| 5,452,954 A | 9/1995 | Handke et al. | |
| 5,484,019 A | 1/1996 | Griffith | |
| 5,522,459 A | 6/1996 | Padgett et al. | |
| 5,570,743 A | 11/1996 | Padgett et al. | |
| 5,571,318 A | 11/1996 | Griffith et al. | |
| 5,588,488 A | 12/1996 | Vijn et al. | |
| 5,588,489 A | 12/1996 | Chatterji et al. | |
| 5,667,340 A | 9/1997 | Bury | |
| 5,672,203 A | 9/1997 | Chatterji et al. | |
| 5,696,059 A | 12/1997 | Onan et al. | |
| 5,711,801 A | 1/1998 | Chatterji et al. | |
| 5,779,787 A | 7/1998 | Brothers et al. | |
| 5,800,756 A | 9/1998 | Andersen et al. | |
| 5,806,594 A | 9/1998 | Stiles et al. | |
| 5,820,670 A | 10/1998 | Chatterji et al. | |
| 5,871,577 A | 2/1999 | Chatterji et al. | |
| 5,897,699 A | 4/1999 | Chatterji et al. | |
| 5,900,053 A | 5/1999 | Brothers et al. | |
| 5,921,319 A | 7/1999 | Curtice | |
| 5,968,255 A | 10/1999 | Mehta et al. | |
| 5,972,103 A | 10/1999 | Mehta et al. | |
| 6,060,535 A | 5/2000 | Villar et al. | 523/130 |
| 6,063,738 A | 5/2000 | Chatterji et al. | |
| 6,109,350 A | 8/2000 | Nguyen et al. | |
| 6,143,069 A | 11/2000 | Brothers et al. | |
| 6,145,591 A | 11/2000 | Boncan et al. | |
| 6,152,227 A | 11/2000 | Lawson et al. | |
| 6,153,562 A | 11/2000 | Villar et al. | |
| 6,156,808 A | 12/2000 | Chatterji et al. | |
| 6,173,778 B1 | 1/2001 | Rae et al. | |
| 6,196,316 B1 | 3/2001 | Bosma et al. | |
| 6,230,804 B1 | 5/2001 | Mueller et al. | |
| 6,244,343 B1 | 6/2001 | Brothers et al. | |
| 6,273,191 B1 | 8/2001 | Reddy et al. | |
| 6,297,202 B1 | 10/2001 | Chatterji et al. | |
| 6,312,515 B1 | 11/2001 | Barlet-Gouedard et al. | |
| 6,332,921 B1 | 12/2001 | Brothers et al. | |
| 6,336,505 B1 | 1/2002 | Reddy | |
| 6,367,549 B1 | 4/2002 | Chatterji et al. | |
| 6,401,814 B1 | 6/2002 | Owens et al. | |
| 6,454,004 B2 | 9/2002 | Reddy et al. | |
| 6,457,524 B1 | 10/2002 | Roddy | |
| 6,488,763 B2 | 12/2002 | Brothers et al. | |
| 6,497,283 B1 | 12/2002 | Eoff et al. | |
| 6,508,305 B1 | 1/2003 | Brannon et al. | |
| 6,511,537 B1 | 1/2003 | Barlet-Gouedard et al. | |
| 6,516,883 B1 | 2/2003 | Chatterji et al. | 166/293 |
| 6,562,122 B2 | 5/2003 | Dao et al. | |
| 6,601,647 B2 | 8/2003 | Brothers et al. | 166/293 |
| 6,626,243 B1 | 9/2003 | Go Boncan | |
| 6,626,991 B1 | 9/2003 | Drochon et al. | |
| 6,630,021 B2 | 10/2003 | Reddy et al. | |
| 6,631,766 B2 | 10/2003 | Brothers et al. | |
| 6,644,405 B2 | 11/2003 | Vijn et al. | 166/293 |
| 6,645,288 B1 | 11/2003 | Dargaud et al. | 106/696 |
| 6,648,961 B2 | 11/2003 | Brothers et al. | |
| 6,656,265 B1 | 12/2003 | Garnier et al. | 106/713 |
| 6,660,078 B2 | 12/2003 | Brothers et al. | |
| 6,689,208 B1 | 2/2004 | Brothers | |
| 6,729,405 B2 | 5/2004 | DiLullo et al. | |
| 6,739,806 B1 | 5/2004 | Szymanski et al. | |
| 6,742,592 B1 | 6/2004 | Le Roy-Delage et al. | 166/293 |
| 6,767,867 B2 | 7/2004 | Chatterji et al. | |
| 6,776,237 B2 | 8/2004 | Dao et al. | |
| 6,793,730 B2 | 9/2004 | Reddy et al. | |
| 6,796,378 B2 | 9/2004 | Reddy et al. | |
| 6,814,798 B2 | 11/2004 | Vijn et al. | 106/724 |
| 6,832,652 B1 | 12/2004 | Dillenbeck et al. | |
| 6,874,578 B1 | 4/2005 | Garnier et al. | |
| 6,904,971 B2 * | 6/2005 | Brothers et al. | 166/293 |
| 6,969,423 B2 | 11/2005 | Li et al. | |
| 2002/0100394 A1 | 8/2002 | Lu | |
| 2003/0116064 A1 | 6/2003 | Danican et al. | |
| 2003/0168215 A1 | 9/2003 | Drochon et al. | |
| 2003/0177954 A1 | 9/2003 | Vijn et al. | |
| 2004/0016371 A1 | 1/2004 | Chatterji et al. | 106/716 |
| 2004/0112600 A1 | 6/2004 | Luke et al. | |
| 2004/0144537 A1 | 7/2004 | Reddy et al. | 166/292 |
| 2004/0168803 A1 | 9/2004 | Reddy et al. | 166/293 |
| 2004/0171499 A1 | 9/2004 | Ravi et al. | 507/200 |
| 2004/0206501 A1 | 10/2004 | Brothers et al. | 166/292 |
| 2004/0211562 A1 | 10/2004 | Brothers et al. | |
| 2004/0211564 A1 | 10/2004 | Brothers et al. | |
| 2004/0226717 A1 | 11/2004 | Reddy et al. | |
| 2004/0244650 A1 | 12/2004 | Brothers | |
| 2004/0260001 A1 | 12/2004 | Caveny et al. | |
| 2004/0262000 A1 | 12/2004 | Morgan et al. | |
| 2005/0011412 A1 | 1/2005 | Vijn et al. | 106/676 |
| 2005/0034864 A1 | 2/2005 | Caveny et al. | |
| 2005/0034866 A1 | 2/2005 | Brothers et al. | |
| 2005/0034867 A1 | 2/2005 | Griffith et al. | |
| 2005/0056191 A1 | 3/2005 | Brothers et al. | |
| 2005/0061505 A1 | 3/2005 | Caveny et al. | |
| 2005/0166803 A1 | 8/2005 | Dillenbeck et al. | |
| 2005/0241538 A1 | 11/2005 | Vargo, Jr. et al. | |
| 2005/0241545 A1 | 11/2005 | Vargo, Jr. et al. | |

FOREIGN PATENT DOCUMENTS

| | | |
|---|---|---|
| EP | 0 814 067 A1 | 12/1997 |
| EP | 0 621 247 B1 | 7/1999 |
| EP | 1 193 230 A1 | 4/2002 |
| EP | 1 236 701 A1 | 9/2002 |
| EP | 1348831 | 10/2003 |
| EP | 1 394 137 A2 | 3/2004 |
| EP | 1 159 234 B1 | 2/2005 |
| GB | 2 387 593 A | 10/2003 |
| WO | WO 97/28097 | 8/1997 |
| WO | WO 00/20350 | 4/2000 |
| WO | WO 00/29351 | 5/2000 |
| WO | WO 00/34199 | 6/2000 |
| WO | WO 01/09056 A1 | 2/2001 |
| WO | WO 01/87796 A1 | 11/2001 |
| WO | WO 01/87797 A1 | 11/2001 |
| WO | WO 2005/047212 A1 | 5/2005 |
| WO | WO 2005/061846 | 7/2005 |

OTHER PUBLICATIONS

3M Worldwide brochure entitled "3M Density Reducing Additives for Drilling Cements" dated 2005.

Halliburton brochure entitled "MicroBond Expanding Additive for Cement" Dated 1999.

Halliburton brochure entitled "MicroBond HT Cement Additive" dated 1999.

Halliburton brochure entitled "MicroBond M Cement Additive" dated 1999.

Halliburton brochure entitled "OptiCem RT™ Cement Job Design and Simulation System" dated 2000.

Halliburton brochure entitled "Halliburton OptiCem™" dated 2000.

Halliburton brochure entitled "Spherelite Cement Additive" dated 1999.
Halliburton brochure entitled "Super CBL Additive Cement Additive" dated 1999.
3M brochure entitled "Specialty Materials For the Oil & Gas Industry" Dated 2004.
Heathman, J. et al., "Case Histories Regarding the Application of Microfine Cements" dated 1992, IADC/SPE 23926.
Harms, Weldon et al., "Ultralow-Density Cementing Operations" dated 1983.
Clarke, J et al., "Ultrafine Cement For Oilwell Cementing" dated 1983, SPE 25868.
Murali, B.N. et al., "Field Performance of Ultralightweight Cement Slurry Compositions Used in the UAE" dated 1987, SPE 13692.
Wu, C. et al., "High-Strength Microsphere Additive Improved Cement Performance in Gulf of Bohai" dated 1986, SPE 14094.
Harris, K., "New Lightweight Technology For the Primary Cementing Of Oilfield Casing In Cold Environments" dated 1991, SPE 22065.
Revil, P. et al., "A New Approach to Designing High-Performance Lightweight Cement Slurries for Improved Zonal Isolation In Challenging Situations" 1998, IADC/SPE 47830.
Moulin, E. et al., "Using Concrete Technology to Improve The Performance of Lightweight Cements", dated 1997, SPE/IADC 39276.
Kimura, K. et al., "Custom-Blending Foamed Cement for Multiple Challenges" dated 1999, SPE/IADC 57585.
Harris, K. et al., "Successful Remedial Operations Using Ultrafine Cement" datd 1992, SPE 24292.
Harness, P. et al., "New Techniques Provides Better Low-Density-Cement Evaluation" dated 1992, SPE 24050.
Ripley, H. et al., "Ultra-Low Density Cementing Compositons"dated 1980, Paper No. 80-31-19.
Harms, W. et al., "Microspheres Cut Density of Cement Slurry," Oil & Gas Journal, Feb. 2, 1981, pp. 59-66.
Halliburton brochure entitled "D-AIR 3000 and D-AIR 3000L Defoamers" dated 1999.
Halliburton brochure entitled "Latex 2000 Cement Additive" dated 1998.
Halliburton brochure entitled "Micro Fly Ash Cement Component" dated 1999.
Halliburton brochure entitled "Pozmix® A Cement Additive" dated 1999.
Halliburton brochure entitled "Stabilzer 434 B Latex Stabilizer" dated 2005.
Halliburton brochure entitled "Thermalock™ Cement For Corrosive CO2 Environments" dated 1999.
Halliburton brochure entitled "CFR-3™ Cement Friction Reducer Dispersant" dated 2005.
Halliburton brochure entitled "Fe-2 Iron Sequestering Agent" dated 1998.
Vassilev, S.V. et al. "Phase-mineral and chemical composition of coal fly ashes as a basis for their multicomponent utilization" dated 2002.
3M Specialty Materials brochure entitled "Scotchlite™ Glass Bubbles HGS Series" dated 2002.
Smith, R.C. et al. "A New Ultra-Lightweight Cement with Super Strength" Journal of Petroleum Technology, pp. 1438-1444.
Halliburton brochure entitled "Continuouse Metering System (CMS) Liquid-Additive Metering System" dated 2000.
Wong, Arthur et al., "Use Of Hollow Glass Bubbles as a Density Reducing Agent for Drilling" dated 2001.
3M brochure entitled "3M™ Glass Bubbles HGS 2000" dated 2004.
Foeign communication from a related counterpart application ated Jul. 30, 2006.
Kulakofsky, D.S. et al., "Compositions For High Temperature Lightweight Cementing" filed Mar. 11, 2005, as U.S. Appl. No. 11/078,090.
Kulakofsky, D.S. et al., "Methods for High Temperature Lightweight Cementing" filed Mar. 11, 2005 as U.S. Appl. No. 11/078,956.
Vargo, Jr., R.F. et al., "Methods of Extending The Shelf Life of and Revitalizing Lightweight Beads For Use In Cement Compositions" filed Aug. 20, 2004 as U.S. Appl. No. 10/922,620.
Vargo, Jr. R.F. Et al., "Methods of Making Cement Compositions Using Liquid Additives Containing Lightweight Beads" filed Apr. 28, 2004 as U.S. Appl. No. 10/833,616.
International Search Report and Written Opinion issued Nov. 3, 2005, in connection International Application No. PCT/GB2005/003183.
International Search Report and Written Opinion issued Sep. 9, 2005, in connection International Application No. PCT/GB2005/001415.
International Search Report and Written Opinion issued Jul. 5, 2006, in connection with International Application No. PCT/GB2006/000406.
Halliburton brochure entitled "Stabilizer 434B Latex Stabilizer" dated 1999.
Halliburton brochure entitled "CFR-3 Cement Friction Reducer Dispersant" dated 1998.
Halliburton brochure entitled "Super CBL Additive Cement Additive" dated 2005.
Halliburton burton entitled "Integrated Cement Job Simulator" dated 1998.
Sabins, "Ultra-Lightweight Cement Slurries Improved Cement Performance," Gas Tips, Fall 2002.
Improved Performance of Ultra-Lightweight Cement Compositions, DOE Project, DE-FC26-00NT40-919, Conducted by Cementing Solutions Inc., first published Oct. 4, 2003.
Office Action from U.S. Appl. No. 11/078,090, filed Sep. 19, 2007.
Office Action from U.S. Appl. No. 10/922,620, filed Sep. 6, 2007.
Office Action issued Oct. 9, 2007, by the United States Patent and Trademark Office in connection with U.S. Appl. No. 10/833,616.
Office Action issued Nov. 14, 2007, by the United States Patent and Trademark Office in connection with U.S. Appl. No. 11/078,956.
Office Action from U.S. Appl. No. 11/078,956, filed Nov. 14, 2007.

* cited by examiner

METHODS OF CEMENTING WITH LIGHTWEIGHT CEMENT COMPOSITIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates to the field of cementing operations and more specifically to the field of using lightweight foamed cement compositions comprising density reducing additives to service a wellbore.

2. Background of the Invention

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed. One example of a secondary cementing operation is squeeze cementing whereby a cement slurry is employed to plug and seal off undesirable flow passages in the cement sheath and/or the casing.

In some environments, cementing operations may need lightweight cement slurries having reduced densities (e.g., a low-density slurry). For instance, cementing across highly depleted zones and weaker formations may need a lightweight cement for sufficient circulation. If the cement cannot be successfully circulated, the desired level of annular fill may not be achieved, and consequently the desired seal may not be achieved. As a result, a large impact on the drilling cost may be experienced and delays in production delivery may occur due to the remedial work.

Lightweight cements are typically prepared by addition of water, microspheres or gas to the cement. Drawbacks to addition of extra water to the cement include reduced efficiency in solidifying of the cement. For instance, the additional water may dilute the cement and thereby extend the time at which the cement may set. Drawbacks to using microspheres include costs associated in adding a sufficient amount of microspheres to reduce the density of the cement to lower than typical densities. Drawbacks to adding gas include excess permeability at high gas concentrations.

Consequently, there is a need in the art for an improved method of preparing a lightweight cement and for cementing with compositions thereof. Other needs include a lightweight cement having improved mechanical properties. In addition, needs in the art include a lightweight cement having a reduced density.

BRIEF SUMMARY OF SOME OF THE PREFERRED EMBODIMENTS

These and other needs in the art are addressed in one embodiment by a method of cementing that includes preparing a base cement composition comprising a cement, a water, and a density reducing additive, wherein the base cement composition comprises a base density. The method further includes introducing a gas to the base cement composition to provide a cement composition having a density less than the base density and allowing the cement composition to set.

In another embodiment, needs in the art are addressed by a method for reducing the density of a cement composition. The method includes selecting a target density of the cement composition. In addition, the method includes forming the cement composition having a first density greater than the target density by a density factor, wherein the cement composition comprises a cement, a water, and a density reducing additive. The method further includes adding a sufficient amount of a gas to the cement composition to reduce the first density to about the target density.

Needs in the art are addressed in another embodiment comprising a cement composition that has water, cement, a density reducing additive, and a gas. The cement composition has a density from about 5 pounds per gallon to about 7.5 pounds per gallon.

A cement composition comprising water, cement, a density reducing additive, and a gas overcomes problems in the art such as reducing the density of conventional cement compositions to low densities. For instance, the density of such a cement composition may be reduced to lower than typical densities. In addition, such a cement composition can have improved mechanical properties (e.g., compressive strength and elasticity) at reduced densities.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
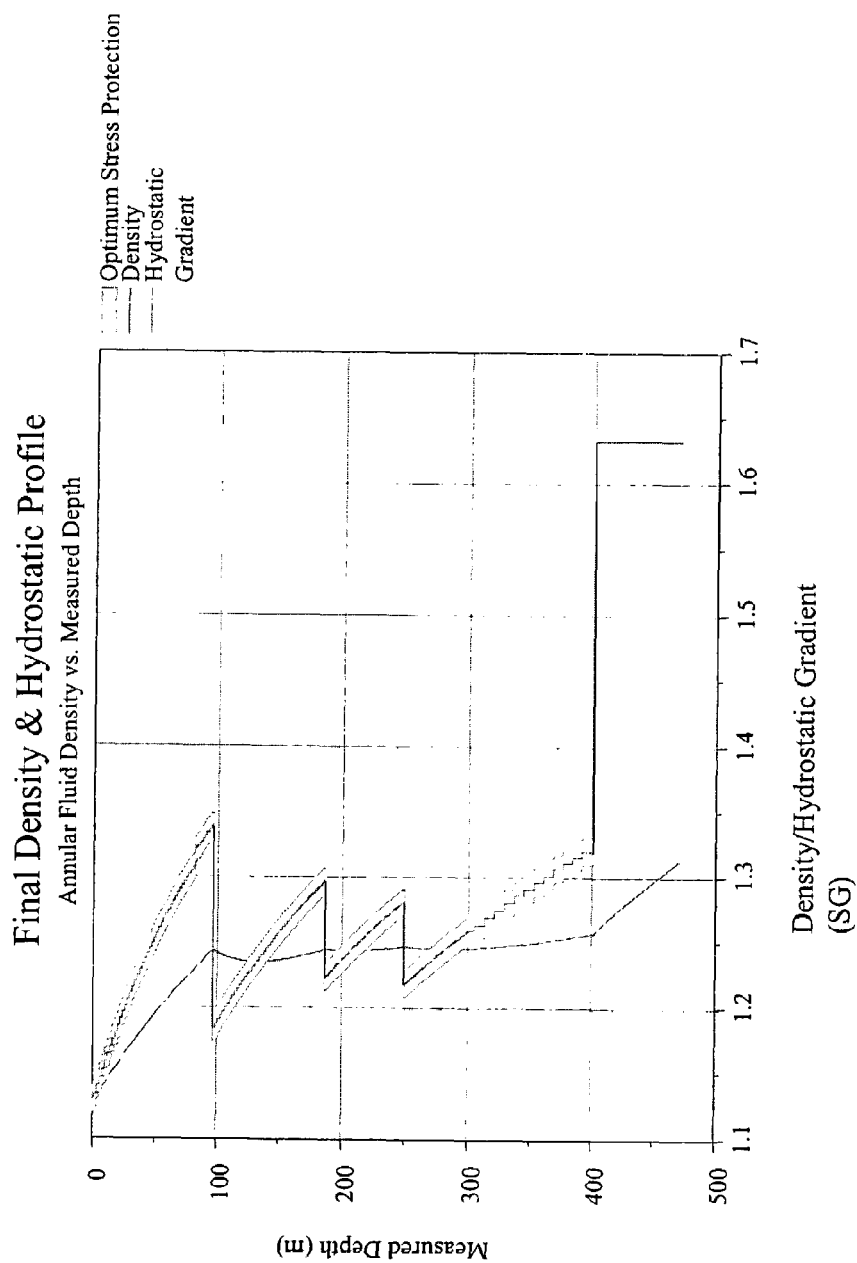
FIG. 1 illustrates an example of a predicted density profile for a staged constant gas rate low-density foamed cement composition.

In an embodiment, a cement composition comprises cement, water, a density reducing additive, and a gas. The gas is introduced to a cement composition comprising cement, water, and a density reducing additive to provide a foamed cement composition (e.g., a lightweight cement composition). In an embodiment, the foamed cement composition is a low-density cement composition. Without being limited by theory, foaming a cement composition comprising density reducing additives provides a low-density cement composition with improved mechanical properties at low densities. Low-density cement compositions refer to cement compositions having a density less than about 14 lb/gallon. It is to be understood that foaming the cement composition comprising density reducing additives is not limited to providing a low-density cement composition but in alternative embodiments can provide a cement composition with a density of about 23 lb/gallon or less.

The cement compositions are suitable for subterranean applications such as well completion and remedial operations. It is to be understood that "subterranean applications" encompass both areas below exposed earth and areas below earth covered by water such as ocean or fresh water.

The cement composition comprises a cement such as hydraulic cement, which includes calcium, aluminum, silicon, oxygen, and/or sulfur and which sets and hardens by reaction with water. Examples of hydraulic cements include but are not limited to Portland cements (e.g., classes A, C, G, and H Portland cements), pozzolana cements, gypsum cements, phosphate cements, high alumina content cements, silica cements, high alkalinity cements, and combinations thereof.

In some embodiments, the cement compositions include a sufficient amount of water to form a pumpable cementitious slurry. The water may be fresh water or salt water, e.g., an unsaturated aqueous salt solution or a saturated aqueous salt solution such as brine or seawater, or a non-aqueous fluid. The water may be present in the amount from about 20 to about 180 percent by weight of cement, alternatively from about 28 to about 60 percent by weight of cement.

The cement composition comprises a sufficient amount of the density reducing additives to reduce the density of the cement composition. The cement composition may include density reducing additives that are compatible with a subterranean cement composition (i.e., that are chemically stable at least until the cement sets). Without limitation, examples of density reducing additives include hollow glass beads, pozzolanic microspheres, solid beads (e.g., solid organic or plastic beads), or combinations thereof.

An example of a suitable hollow glass bead is commercially available from 3M Company as SCOTCHLITE. An example of a suitable microsphere is commercially available from Halliburton Energy Services, Inc. as SPHERELITE. In addition, an example of a suitable solid bead is commercially available from Halliburton Energy Services, Inc. as FDP-C665. The density reducing additives may be added to the cement composition by any suitable method including dry blending with the cement before the addition of water, mixing with the water to be added to the cement, or by mixing with the cement slurry consecutively with or after the addition of the water. In another embodiment, the density reducing additives may be pre-suspended in water and injected into the cement mix fluid or into the cement slurry as an aqueous slurry.

The gas may include any gas suitable for foaming the cement composition and for use in a wellbore. Without limitation, examples of suitable gases include nitrogen, air (e.g., compressed air), or combinations thereof. In some embodiments, the gas is nitrogen. The gas may be introduced to the cement composition by any method suitable to foam the cement composition. In addition, the gas may be introduced at a constant rate or a ramped rate to yield a constant downhole foam concentration or density. In an embodiment, introducing the gas into the cement composition to foam the cement composition may be accomplished by adding an expanding agent comprising foaming agents, foam stabilizing agents, expanding additives, or combinations thereof to the cement composition, which may be included in the cement composition to facilitate the foaming and/or enhance the stability of the cement composition. Such foaming and/or foam stabilizing agents may be present in the cement composition in an amount sufficient to provide a stable, foamed cement composition. It is to be understood that one of ordinary skill in the art would be able to select the proper foaming and/or foam stabilizing agents according to the particular application.

In an embodiment, the cement composition includes an expanding additive. The expanding additive may be any component that enables a gas to become incorporated into the cement composition. Without limitation, examples of suitable expanding additives in particulate form include aluminum powder, gypsum blends, deadburned magnesium oxide, and combinations thereof. Examples of expanding additives comprising aluminum powder that are commercially available include GAS-CHEK and SUPER CBL from Halliburton Energy Services, Inc. An example of an expanding additive comprising a blend containing gypsum is commercially available as MICROBOND from Halliburton Energy Services, Inc. In addition, examples of expanding additives comprising deadburned magnesium oxide are commercially available as MICROBOND M and MICROBOND HT from Halliburton Energy Services. Inc. Such expanding additives are described in U.S. Pat. Nos. 4,304,298; 4,340,427; 4,367,093; 4,450,010 and 4,565,578, which are incorporated herein by reference in their entirety.

The addition of an expanding additive to the cement composition may be accomplished by any suitable method. In one embodiment, the cement composition is foamed by direct injection of an expanding additive into the cement composition. For instance, where the cement composition is foamed by the direct injection of gas into the cement composition, the gas utilized may be air, an inert gas such as nitrogen, or combinations thereof. In other embodiments, the cement composition is foamed by gas generated from a reaction between the cement composition and an expanding additive present in the cement composition in particulate form. For example, the cement composition may be foamed by hydrogen gas generated in situ as the product of a reaction between the high pH slurry and fine aluminum powder present in the cement.

The cement composition is prepared to have a density at about a target density. In an embodiment, the cement composition is prepared or placed in a wellbore and has a density (e.g., target density) less than about that of a fracture gradient in the wellbore. The fracture gradient refers to the force that induces rock to fracture at a given depth. The variability of the fracture gradient for a given wellbore as a function of depth may be graphed and may be referred to as a fracture gradient profile. The density of the cement composition can be predicted and plotted as a downhole density profile. In another embodiment, the cement composition has a density (e.g., target density) from about 4 to about 14 lb/gallon, alternatively from about 5 to about 7.5 lb/gallon, and alternatively from about 5 to about 6 lb/gallon. In an alternative embodiment, the cement composition has a density from about 7.5 lb/gallon to about 12 lb/gallon.

The cement composition is prepared by selecting a target density at which the cement composition is to be circulated.

It is to be understood that the target density may be selected based upon factors such as the particular application, wellbore environment, and the like. A base cement composition is then prepared having a base density that is greater than the target density by a density factor. The base cement composition comprises water, cement, and a density reducing additive. The density factor is a numerical factor applied to the selected target density to increase the target density to the base density and thereby allowing sufficient quantities of gas to then be added to provide the desired downhole properties. The density factor may be selected based upon factors such as desired downhole properties of elasticity, cohesion, or compressibility In an embodiment, the density factor is from about 1.01 to about 1.4, alternatively 1.01 to about 1.3, further alternatively from about 1.2 to about 1.3, and alternatively about 1.25. To prepare the base cement composition, a sufficient amount of the density reducing additives are added to a slurry comprising cement and water to reduce the density of the slurry and provide the base cement composition having a density at about the desired base density. The base cement composition may then be foamed by introducing the gas to the base cement composition. A sufficient amount of the gas is added to reduce the density of the base cement composition and provide the cement composition with a density at about the target density. It is to be understood that the target density may be the final density at which the cement composition can be safely circulated in the wellbore. In an embodiment, the cement composition comprises from about 10 to about 30 vol. % gas, alternatively from about 20 to about 30 vol. % gas, and alternatively from about 25 to about 30 vol. % of the gas. It is to be further understood that a sufficient amount of the expanding agent may be added to the cement composition to provide the amount of gas suitable for achieving the target density.

In one embodiment, the base density and downhole density profile may be determined utilizing a computer simulation program. In an embodiment, the percent volume of gas in the cement slurry is monitored in real-time using a software program. Alternatively, the downhole density profile and real-time monitoring of the percent volume of gas addition to the cement slurry is automatically controlled and monitored utilizing a computer and appropriate simulation and automation software. Software for monitoring the percent volume of gas addition to the base cement composition may function to identify the composition rate and calculate the proper gas injection rate based on the actual composition rate and predetermined target density. In some embodiments, the software functions as a component of an automated gas introduction device that synchronizes the gas injection rate with the cement slurry concentration rate to achieve the target density. Examples of suitable software include but are not limited to HALWIN or INSITE, which are commercially available from Halliburton Energy Services, Inc. In an embodiment, the computer is a digital computer such as an IBM Intel Pentium-based personal computer capable of receiving input from multiple detectors through serial interfaces. The computer may also be capable of receiving input through a standard keyboard or another computer.

Without being limited by theory, foaming a cement composition comprising density reducing additives provides a low-density cement composition having improved mechanical properties. Mechanical properties of the cement composition that may be improved by foaming the cement composition comprising density reducing additives include without limitation compressibility and elasticity. Metrics utilized to define elasticity include Poisson's ratio and Young's modulus.

Poisson's ratio refers to the ratio of transverse contraction strain to longitudinal strain in the direction of stretching force and is represented by the following Equation (1):

$$\nu = \epsilon_{transverse}/\epsilon_{longitudinal} \tag{1}$$

wherein $\nu$ represents Poisson's ratio and $\epsilon$ represents strain as defined by the change in length divided by the original length. Young's modulus, $\lambda$, is indicative of the elasticity of a material or the tendency of the material to deform under an applied force. Young's modulus is represented by the following Equation (2):

$$\lambda = (F/A)/(x/l) \tag{2}$$

where F is the applied force, A is the area to which the force is applied, X is the extension of the material when the force is applied and 1 is the original length of the material.

In an embodiment, the cement compositions may have a compressive strength between about 200 psi and about 3,000 psi, alternatively between about 500 psi and about 1,500 psi. In other embodiments, the cement compositions may have a tensile strength between about 30 psi and about 500 psi, alternatively between about 50 psi and about 150 psi. Moreover, the cement compositions may have a Young's modulus between about 60,000 and about 6,000,000, alternatively between about 200,000 and about 900,000.

It is to be understood that preparation of the cement composition is not limited to foaming a base cement composition comprising density reducing additives but instead may include adding density reducing additives to a foamed cement. For instance, in an alternative embodiment, a base cement composition can be prepared with a base density by foaming a cement slurry comprising cement and water. In such an alternative embodiment, the base cement composition comprises water, cement, and a gas. The low-density cement composition is then prepared by adding the density reducing additives to the base cement composition to provide the low-density cement composition having about the target density.

In some embodiments, additional additives may be added to the cement composition for improving or changing the properties thereof. Examples of such additives include but are not limited to salts, accelerants, set retarders, defoamers, fluid loss reducing agents, settling prevention agents, gas migration prevention additives, weighting materials, dispersants, vitrified shale, formation conditioning agents, and combinations thereof. Other mechanical property modifying additives, for example, carbon fibers, glass fibers, metal fibers, minerals fibers, thermoplastic elastomers such as styrene butadiene or acrylonitrile-styrene-butadiene random or block polymers, and latex emulsions, for example styrene-butadiene latexes, and the like can be added to further modify the mechanical properties.

The foregoing cement compositions may be used in various cementing operations wherein the cement is displaced into a workspace and allowed to set. In an embodiment, the cement compositions are used in various surface applications to cement a workspace at or above the ground, for example, a workspace encountered in the construction industry. In another embodiment, the cement is used in a subterranean workspace, for example in cementing underground pipe such as sewer pipe or wellbore casing. In one embodiment, the cement compositions may be employed in primary cementing of a wellbore for the recovery of natural resources such as water or hydrocarbons. Primary cementing first involves drilling a wellbore to a desired depth such that the wellbore penetrates a subterranean formation while circulating a drilling fluid through the wellbore. Subsequent to drilling the wellbore, at least one conduit such as a casing may be placed in the wellbore while leaving a space known as the annulus between the wall of the conduit and the wall of the wellbore. The drilling fluid may then be displaced down through the conduit and up through the annulus one or more times, for example, twice, to clean out the hole. The cement composition may then be conveyed downhole and up through the annulus, thereby displacing the drilling fluid from the wellbore. The cement composition sets into a hard mass, which forms a cement column that isolates an adjacent portion of the subterranean formation and provides support to the adjacent conduit.

In another embodiment, the cement composition may be employed in a secondary cementing operation such as squeeze cementing, which is performed after the primary cementing operation. In squeeze cementing, the cement composition is forced under pressure into permeable zones through which fluid can undesirably migrate in the wellbore. Examples of such permeable zones include fissures, cracks, fractures, streaks, flow channels, voids, high permeability streaks, annular voids, or combinations thereof. The permeable zones may be present in the cement column residing in the annulus, a wall of the conduit in the wellbore, a microannulus between the cement column and the subterranean formation, and/or a microannulus between the cement column and the conduit. The cement composition sets within the permeable zones, thereby forming a hard mass to plug those zones and prevent fluid from leaking therethrough.

To further illustrate various illustrative embodiments of the present invention, the following examples are provided.

EXAMPLES

Example 1

Seven wells were drilled with the following procedures: 20 inch surface casing was set down to 541 ft, 394 ft of a 13⅜-in. scab liner was set to 1,378 ft, a 9⅝-in. intermediate string was set to 1,545 ft, and a 7-in. production string was set at 2,756 ft. The upper formations were such that successful cementing could be accomplished with conventional cementing techniques. However, the intermediate and production strings were to be cemented past zones that required cement densities to be reduced to 10.6 lb/gal or less. 13.6 lb/gal was chosen as the base slurry density so that when the target density was attained, the foam quality (e.g., vol. % of foam in the cement composition) would be between 20 and 25%. The target density was 10.6 lb/gal and was chosen to allow successful circulation of a full cementing column. Microspheres were added to the base slurry to provide the base cement composition with a density of 13.6 lb/gal. The microspheres were HGS-4000 glass bubbles from 3 M, which were intermediate-strength glass microspheres with a specific gravity of 0.38.

The entire process was monitored in real-time using a software program, HALWIN, and a correct amount of nitrogen was added to the base cement composition at each stage using an adjustable choke. The choke was adjusted until the surface foam density matched the calculated density for that rate and pressure. The low-density base cement composition was used as the tail, without gas in the process.

For the 9⅝-in. string, 267.3 bbl of unfoamed cement composition, 13.6 lb/gal lead slurry and 22.6 bbl of tail slurry were used. The theoretical in-place foam volume for the lead slurry was 347.8 bbl (at 10.6 lb/gal). For the 7-in. string, 96.2 bbl of lead slurry, and 3.1 bbl of tail slurry were used. The theoretical in-place foam volume for the lead slurry was 125.8 bbl.

Figure 2:
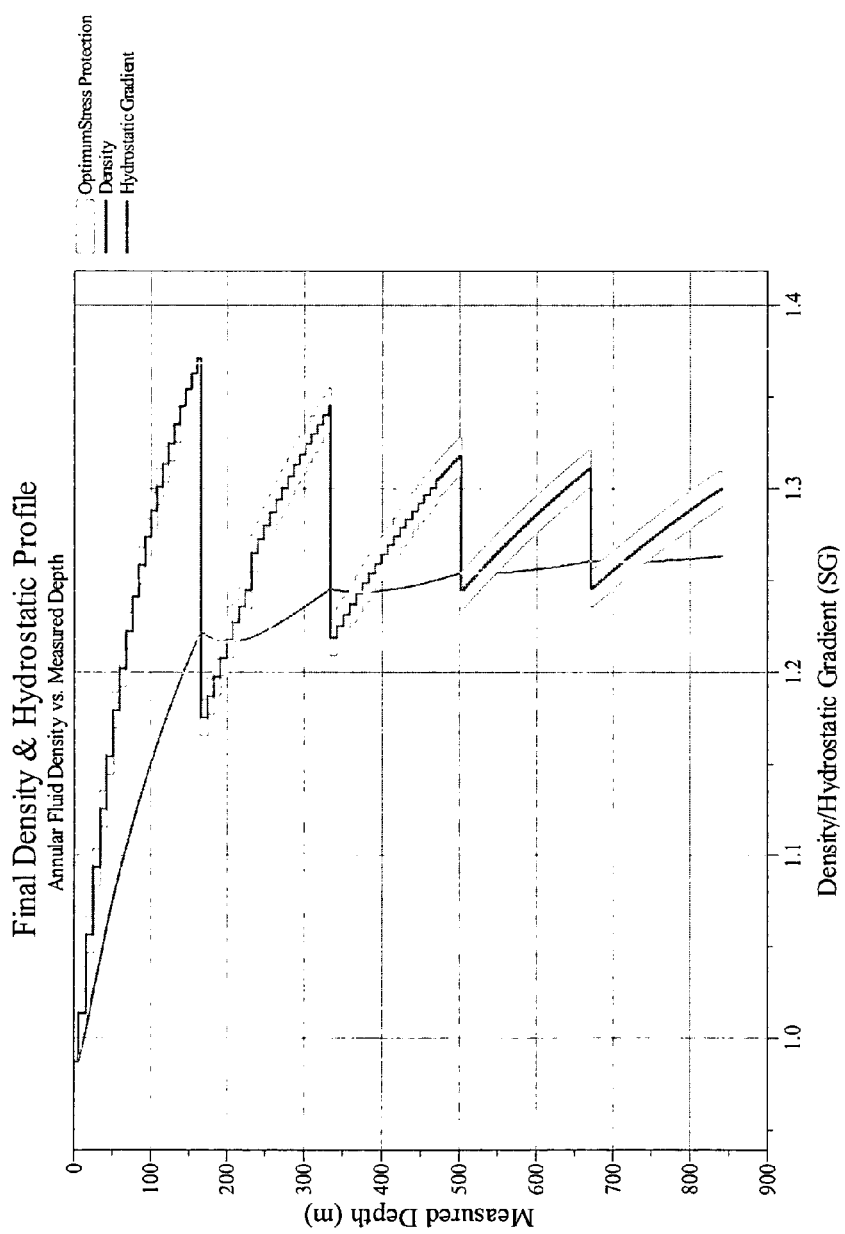
FIG. 2 illustrates a predicted density profile of another low-density foam cement composition.

A computer simulation program, OPTICEM commercially available from Halliburton Energy Services, Inc., was used to engineer the backpressure and nitrogen schedules. FIGS. 1 and 2 display the theoretical in-place density profiles for the 9⅝-in. and 7-in. jobs, respectively. These curves indicated that by reducing the nitrogen rate four and five times, respectively, the specific gravity of the foam would be maintained between 1.2 and 1.3 (10-10.8 lb/gal), for most of the well, which correlated to the desired foam quality of 20 to 25%. It can also be seen in FIGS. 1 and 2 that expansion occurs more rapidly as the surface was approached. To minimize expansion, cementing software allowed the back-pressure schedule to be adjusted as needed Table I provides the planned back-pressure schedules for the two foamed casing strings. As the foam was placed up the annulus, more back-pressure was applied. To better control downhole rate and slurry consistency, a 100-bbl batch mixer was included in the job procedure.

TABLE I

Back-Pressure Schedule for Wells

| 9⅝-in. Intermediate Casing Job Backpressure (psi) | 7-in. Production Casing Job Backpressure (psi) |
|---|---|
| 14.7 | 14.7 |
| 90 | 65 |
| 115 | 100 |
| 140 | 125 |
| 165 | N/A |

Example 2

Thirteen Runs were performed (Runs 1-13) with foamed cement compositions comprising cement, water, microspheres, and gas. The foamed cement compositions were prepared by mixing a base cement composition comprising water, cement, and microspheres to have a density between 10 and 12 lb/gal. The base cement composition was foamed to a density of 8.33 lb/gal with about 50-600 scf/bbl of nitrogen.

Table II lists data related to the wells drilled in Runs 1-13. Table III lists the amounts and densities of the base cement compositions and the foamed cement compositions used in the Runs.

TABLE II

Foamed Lightweight Slurry Cemented Well Data

| RUNS | Liner Size (in.) | Job Depth (ft) | BHST (° F.) |
|---|---|---|---|
| 1 | 7 | 14632 | 273 |
| 2 | 7 | 13760 | 255 |
| 3 | 7 | 11647 | 226 |
| 4 | 7 | 14964 | 258 |
| 5 | 5 | 14902 | 275 |
| 6 | 5 | 13409 | 222 |
| 7 | 7 | 13638 | 256 |
| 8 | 7 | 14577 | 269 |
| 9 | 7 | 14862 | 270 |
| 10 | 7 | 14606 | 246 |

TABLE II-continued

Foamed Lightweight Slurry Cemented Well Data

| RUNS | Liner Size (in.) | Job Depth (ft) | BHST (° F.) |
|---|---|---|---|
| 11 | 7 | 13596 | 250 |
| 12 | 7 | 12477 | 207 |
| 13 | 5 | 14980 | 267 |

TABLE III

Foamed Lightweight Cement Job Data

| Runs | Base Slurry Volume (bbl) | Foamed Slurry Volume (bbl) | Base Density (lb/gal) | In-Place Foam Density (lb/gal) |
|---|---|---|---|---|
| 1 | 25 | 36 | 15 | 10.8 |
| 2 | 33 | 48 | 15 | 10.8 |
| 3 | 38.8 | 59 | 11.7 | 8.33 |
| 4 | 50.5 | 72 | 10.8 | 8.33 |
| 5 | 34.8 | 49.1 | 10.8 | 8.33 |
| 6 | 16.9 | 23.2 | 10.8 | 8.33 |
| 7 | 51 | 72.5 | 10.8 | 8.33 |
| 8 | 32.3 | 49.7 | 11.7 | 8.33 |
| 9 | 43.4 | 67.4 | 11.7 | 8.33 |
| 10 | 56 | 86 | 11.7 | 8.33 |
| 11 | 36.7 | 56.3 | 11.7 | 8.33 |
| 12 | 49 | 76 | 11.7 | 8.33 |
| 13 | 20 | 31 | 11.7 | 8.33 |

The 13 liner tops cemented in this Example 2 were tested to an average pressure of 1,400 psi for 20 minutes, without leaking. Initial and actual production rates before and after well stimulation as shown in Table IV for Runs 3-5 and 7-10 illustrate the effectiveness of the sealing capability and chemical attack resistance of the foamed cement compositions. The effectiveness of the seal achieved utilizing the methods and compositions disclosed was further illustrated by the ability of the wells to undergo subsequent fracturing treatments.

TABLE IV

Foamed Lightweight Cement Before-and-After Production Rates

| RUNS | Pay Zone Depth (ft) | Initial Production (BOPD) | Actual Production (BOPD) |
|---|---|---|---|
| 3 | 12,795-12,936 | 618 | 1,352 |
| 4 | 14,180-14,305 | 0 | 1,258 |
| 5 | 14,518-14,419 | 1,006 | 1,635 |
| 7 | 12,999-13,097 | 0 | 566 |
| 8 | 14,206-14,337 | 0 | 1,541 |
| 9 | 14,623-14,741 | 0 | 1,793 |
| 10 | 14,058-14,222 | 0 | 1,182 |

Example 3

Figure 3:
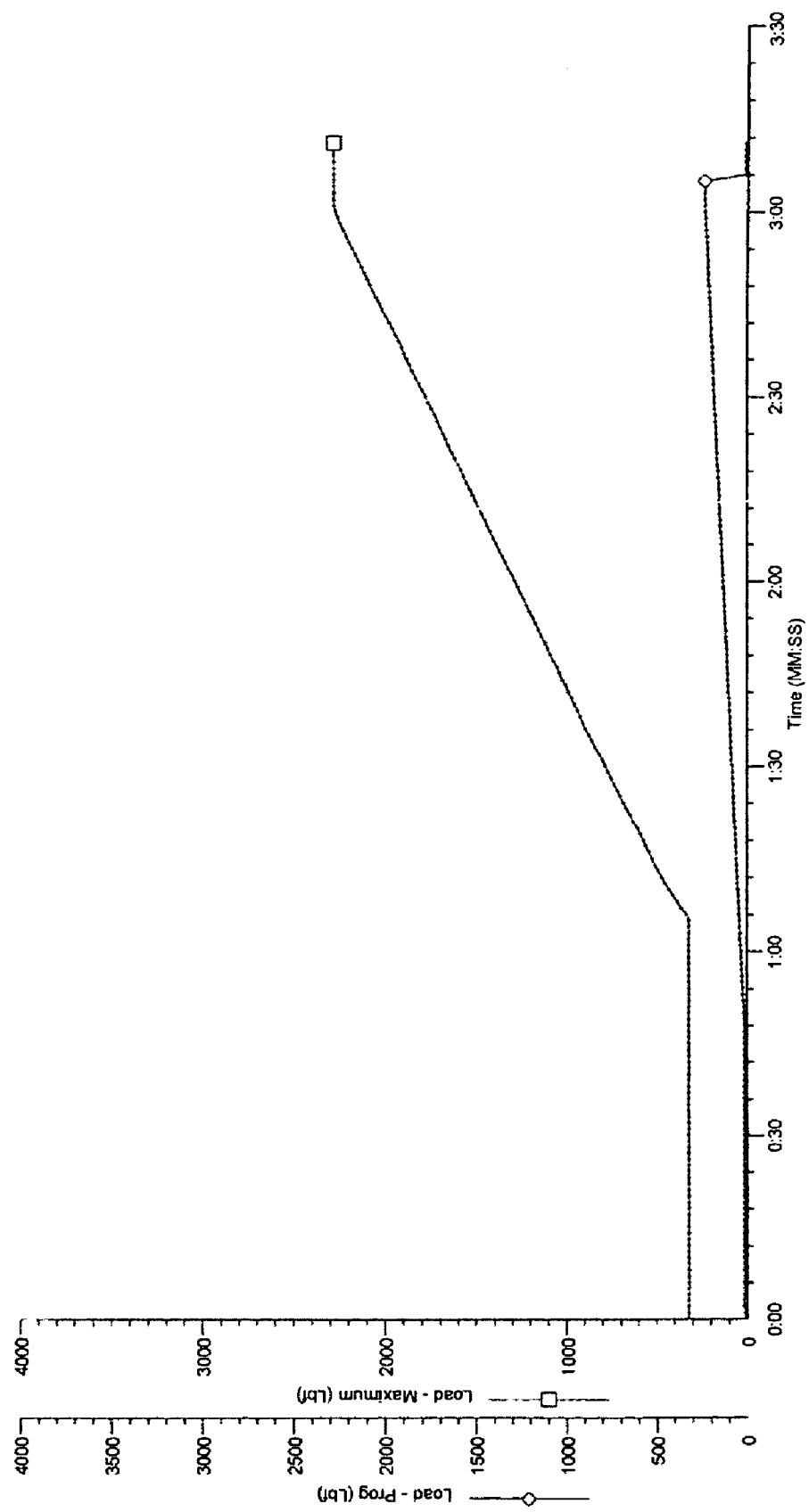
FIG. 3 illustrates a 5.0 lb/gal cement crush-test chart.

A 7.5-lb/gal base cement composition was foamed down to 5 lb-/gal to produce a sealant quality low-density cement composition. The base cement composition and low density cement compositions were subjected to tests of fluid loss thickening time, free water and compressive strength. The tests were conducted according to API 10b procedures. At 212° F., the base slurry yielded 1,369-psi compressive strength, and after being foamed down to 5 lb/gal still yielded 703-psi 24-hour compressive strength. FIG. 3 illustrates a crush test implemented on the foamed cement composition after it was set.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of cementing, comprising:
preparing a base cement composition comprising a cement, a water, and a density reducing additive, wherein the base cement composition comprises a base density;
introducing a gas to the base cement composition to provide a cement composition having a density less than the base density; and
allowing the cement composition to set,
wherein the cement composition is prepared by:
selecting a target density of the cement composition, wherein the target density is about the density of the cement composition;
forming the base cement composition having the base density greater than the target density by a density factor;and
adding a sufficient amount of the gas to the base cement composition to form the cement composition having about the target density, and
wherein the density factor is from about 1.01 to about 1.4.

2. The method of claim 1, wherein the density is from about 5 to about 7.5 pounds per gallon.

3. The method of claim 1, wherein the cement composition comprises from about 10 to about 30 volume percent of the gas.

4. The method of claim 1, wherein the cement composition has a compressive strength from about 200 to about 3,000 psi.

5. The method of claim 1, wherein the density reducing additive comprises hollow glass beads, pozzolanic microspheres, solid beads, or combinations thereof.

6. The method of claim 1, wherein the cement composition is placed in a wellbore.

7. The method of claim 1, wherein the density is less than about a fracture gradient of the wellbore.

8. The method of claim 1, wherein the gas is introduced at a constant rate or a ramped rate to yield a constant downhole foam concentration or density.

9. The method of claim 1, wherein introducing the gas into the base cement composition comprises adding an expanding agent comprising foaming agents, foam stabilizing agents, expanding additives, or combinations thereof to the base cement composition.

10. A method of cementing, comprising:
  preparing a base cement composition comprising a cement, a water, and a density reducing additive, wherein the base cement composition comprises a base density;
  introducing a gas to the base cement composition to provide a cement composition having a density less than the base density;and
  allowing the cement composition to set,
  wherein the cement composition is placed in a wellbore, and
  wherein the density is less than about a fracture gradient of the wellbore.

11. The method of claim 10, wherein the gas comprises nitrogen.

12. The method of claim 10, wherein the density is from about 5 to about 7.5 pounds per gallon.

13. The method of claim 10, wherein the cement composition comprises from about 10 to about 30 volume percent of the gas.

14. The method of claim 10, wherein the cement composition has a compressive strength from about 200 to about 3,000 psi.

15. The method of claim 10, wherein the density reducing additive comprises hollow glass beads, pozzolanic microspheres, solid beads, or combinations thereof.

16. The method of claim 10, wherein the cement composition is prepared by:
  selecting a target density of the cement composition, wherein the target density is about the density of the cement composition;
  forming the base cement composition having the base density greater than the target density by a density factor;and
  adding a sufficient amount of the gas to the base cement composition to form the cement composition having about the target density.

17. The method of claim 10, wherein the cement composition is placed in a wellbore.

18. The method of claim 10, wherein the gas comprises nitrogen.

19. The method of claim 10, wherein the gas is introduced at a constant rate or a ramped rate to yield a constant downhole foam concentration or density.

20. The method of claim 10, wherein introducing the gas into the base cement composition comprises adding an expanding agent comprising foaming agents, foam stabilizing agents, expanding additives, or combinations thereof to the base cement composition.

* * * * *